(12) United States Patent
Ido

(10) Patent No.: US 7,989,559 B2
(45) Date of Patent: Aug. 2, 2011

(54) PLANT RESIN COMPOSITION AND PLANT RESIN MOLDED PRODUCT

(75) Inventor: Sachio Ido, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/898,107

(22) Filed: Sep. 10, 2007

(65) Prior Publication Data

US 2008/0071038 A1  Mar. 20, 2008

Related U.S. Application Data

(63) Continuation of application No. PCT/JP2005/004328, filed on Mar. 11, 2005.

(51) Int. Cl.
 *C08G 63/08* (2006.01)
 *C08G 18/62* (2006.01)

(52) U.S. Cl. .................................. 525/450; 525/451

(58) Field of Classification Search ............... 525/540, 525/451
 See application file for complete search history.

(56) References Cited

U.S. PATENT DOCUMENTS

| | | | |
|---|---|---|---|
| 5,216,050 A * | 6/1993 | Sinclair | 524/108 |
| 5,681,906 A * | 10/1997 | Yezrielev et al. | 525/450 |
| 6,803,443 B1 * | 10/2004 | Ariga et al. | 528/354 |
| 6,875,802 B2 * | 4/2005 | Cruz et al. | 524/54 |
| 7,863,382 B2 | 1/2011 | Ishii et al. | |
| 2001/0024354 A1 | 9/2001 | Mori et al. | |
| 2002/0161126 A1 * | 10/2002 | Cruz et al. | 525/193 |
| 2003/0056966 A1 | 3/2003 | Mori et al. | |
| 2004/0034121 A1 * | 2/2004 | Nozaki et al. | 523/124 |
| 2004/0147674 A1 * | 7/2004 | Kakeda et al. | 525/88 |
| 2004/0242803 A1 | 12/2004 | Ohme et al. | |
| 2006/0148969 A1 | 7/2006 | Tanaka et al. | |
| 2007/0276090 A1 * | 11/2007 | Aoki et al. | 525/70 |

FOREIGN PATENT DOCUMENTS

| | | |
|---|---|---|
| EP | 1 398 352 A1 | 3/2004 |
| EP | 1 445 282 A1 | 8/2004 |
| JP | 2001-244645 A | 9/2001 |
| JP | 2002-155207 | 5/2002 |
| JP | 2002-167451 | 6/2002 |
| JP | 2003-138119 A | 5/2003 |
| JP | 2003-286396 A | 10/2003 |
| JP | 2003-342452 A | 12/2003 |
| JP | 2004-272620 | 9/2004 |
| JP | 2004-277497 A | 10/2004 |
| JP | 2005-036054 | 2/2005 |
| JP | 2005-48067 | 2/2005 |
| JP | 2006-111858 | 4/2006 |
| WO | WO 0170846 A1 * | 9/2001 |
| WO | WO03014224 A1 * | 2/2003 |

* cited by examiner

*Primary Examiner* — Mark Eashoo
*Assistant Examiner* — Liam J Heincer
(74) *Attorney, Agent, or Firm* — Arent Fox LLP

(57) ABSTRACT

The present invention provides a plant resin composition containing a polylactic acid, a thermoplastic resin, and a compatibilizer, in which the compatibilizer is a polymeric material formed from an alkyl methacrylate monomer and has a weight-average molecular weight of not less than 950,000 and not more than 4,100,000. The alkyl methacrylate monomer preferably is at least one selected from methyl methacrylate, ethyl methacrylate, propyl methacrylate, and butyl methacrylate. By forming a plant resin molded product with this plant resin composition, the impact resistance and the heat resistance of the plant resin molded product can be enhanced.

8 Claims, 1 Drawing Sheet

PLANT RESIN COMPOSITION AND PLANT RESIN MOLDED PRODUCT

CROSS-REFERENCE TO RELATED APPLICATIONS

This application is a U.S. continuation application of and claims the benefit of International Application Number PCT/JP2005/004328, filed Mar. 11, 2005. The disclosure of the prior application is hereby incorporated herein in its entirety by reference.

TECHNICAL FIELD

The present invention relates to a plant resin composition and a plant resin molded product formed with the plant resin composition.

BACKGROUND ART

In recent years, the mass consumption-induced exhaustion of fossil resources typified by petroleum and the global warming caused by an increase in the carbon dioxide concentration have arisen as problems. This has led to a worldwide attempt to replace the petroleum-derived resins for general-purpose use with plant resins such as polylactic acids, which are derived from plants. Polylactic acids are made from plants such as corn, which do not worry us about exhaustion thereof, and after being disposed, they are decomposed into water and carbon dioxide, which are nontoxic, by workings of microorganisms in soil. Further, polylactic acids are circulating-type materials such that water and carbon dioxide generated by incineration thereof are returned into plants again by photosynthesis, and hence, they place only low load on the environment.

Recently, it is proposed to use plant resins principally containing polylactic acids even for forming enclosures for electronic equipment such as notebook personal computers, cellular telephones, etc. (see Patent Document 1).

Though possessing high stiffness such as flexural strength, polylactic acids as resins however have low impact resistances such as Izod impact strength, and low heat resistance such as load deflection temperature. Therefore, it is difficult to use it alone for forming enclosures for electronic equipment. As one of solutions of this problem, a polymer alloy is proposed, which is obtained by replacing a part of a polylactic acid with a petroleum-derived thermoplastic resin that has excellent impact resistance and heat resistance (see Patent Documents 2, 3, and 4).

Patent Document 1: JP 2001-244645 A
Patent Document 2: JP 2003-138119 A
Patent Document 3: JP 2003-342452 A
Patent Document 4: JP 2004-277497 A The Patent Document 2 describes resin compositions in which a polylactic acid, a polyacetal resin, and an acrylic resin are used as its ingredients, thus proposing resin compositions that have excellent moldability, processability, mechanical characteristics, and heat resistance.

The Patent Document 3 describes resin compositions containing a polylactic acid-based resin, an aliphatic polyester other than polylactic acid-based resins, and a plasticizer, thus proposing resin compositions that have excellent impact resistance and heat resistance.

The Patent Document 4 describes resin compositions containing a polylactic acid-based resin, an aliphatic polyester other than polylactic acid-based resins, and an inorganic filler, thus proposing resin compositions obtained by improving the impact resistance and heat resistance of the polylactic acid-based resin.

A polymer alloy of a polylactic acid and a thermoplastic resin, as described above, generally is obtained through a kneading step in which a pellet of a polylactic acid and a pellet of a thermoplastic resin are molten at a high temperature and mixed. In the kneading step, if a polylactic acid and a thermoplastic resin are not mixed finely and homogeneously, the properties such as impact resistance and heat resistance of the polymer alloy thus obtained cannot be enhanced. Conventionally, there are many obstacles to the mixing of a polylactic acid and a thermoplastic resin, because of their polarity or non-polarity, and it is difficult to form an ideal polymer alloy. Therefore, an impact resistance and a heat resistance obtained with a polymer alloy of a polylactic acid and a thermoplastic resin cannot be as high as expected.

DISCLOSURE OF INVENTION

The present invention provides a plant resin composition containing a polylactic acid and a thermoplastic resin that are mixed finely and homogeneously, and exhibiting high impact resistance and heat resistance, as well as a plant resin molded product formed with the foregoing composition.

The plant resin composition of the present invention is a plant resin composition containing a polylactic acid, a thermoplastic resin, and a compatibilizer, wherein the compatibilizer is a polymeric material formed from an alkyl methacrylate monomer and has a weight-average molecular weight of not less than 950,000 and not more than 4,100,000.

The plant resin molded product of the present invention is a plant resin molded product formed with a plant resin composition containing a polylactic acid, a thermoplastic resin, and a compatibilizer, wherein the compatibilizer is a polymeric material formed from an alkyl methacrylate monomer and has a weight-average molecular weight of not less than 950,000 and not more than 4,100,000.

The present invention, having the above-described configurations, can provide a plant resin composition that has high impact resistance and heat resistance and contains a polylactic acid, as well as a plant resin molded product formed with the foregoing composition.

BEST MODE FOR CARRYING OUT THE INVENTION

Figure 1:
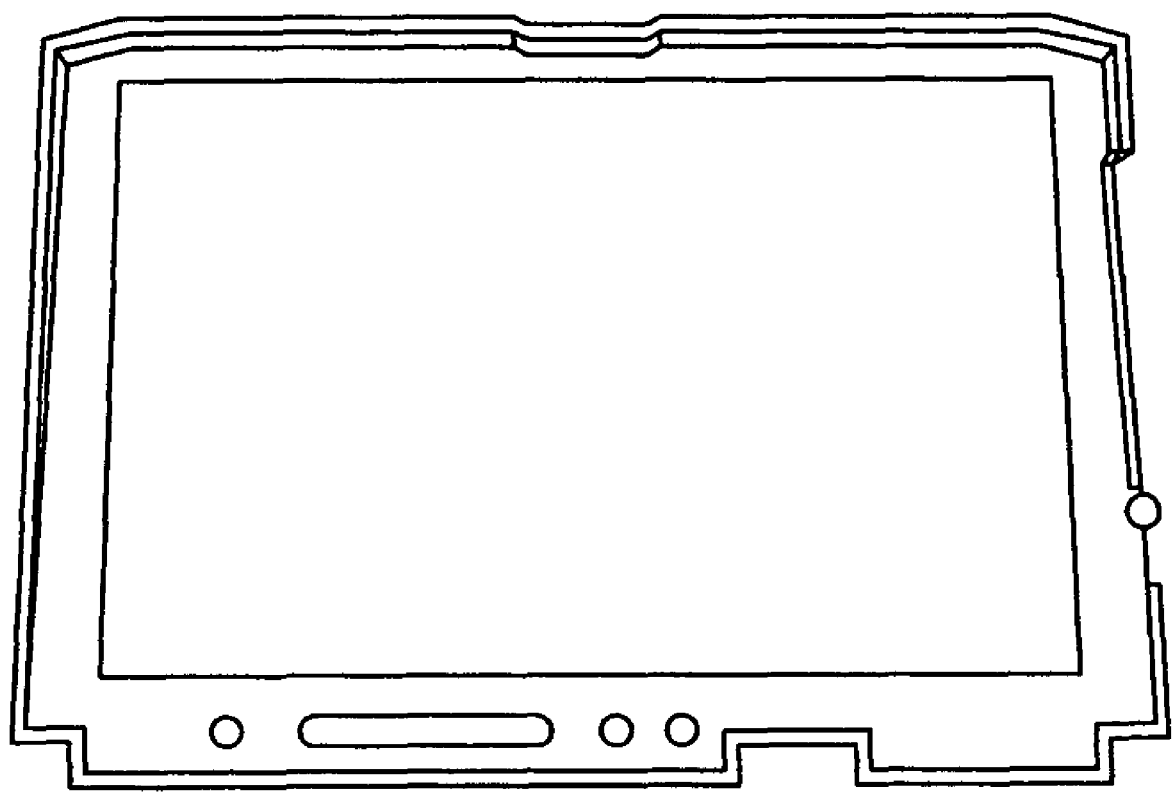
FIG. 1 is a front view illustrating an enclosure for a notebook personal computer as an example of the plant resin molded product of the present invention.

An example of a plant resin composition of the present invention is a polymer alloy that contains a polylactic acid, a thermoplastic resin, and a compatibilizer. The compatibilizer is a polymeric material formed from an alkyl methacrylate monomer, and a weight-average molecular weight of the compatibilizer is not less than 950,000 and not more than 4,100,000.

Further, an example of the plant resin molded product of the present invention is a plant resin molded product formed with the above-described plant resin composition.

The polylactic acid is a plant (biodegradable) resin derived from a plant, and by forming a molded product with use of a resin containing the polylactic acid, the biodegradability can be imparted to the molded product. Therefore, even if this molded product is abandoned in soil without being processed, the most part thereof is decomposed naturally by microorganisms existing in soil into water and carbon dioxide, which are nontoxic. Since this molded product emits only small combustion heat upon its combustion, the molded product causes only reduced damage to a furnace. Furthermore, since the generation of toxic substances such as dioxin is suppressed, the above-described molded product places only low load on the environment, thus exhibiting excellent environmental friendliness.

The molecular weight and the molecular weight distribution of the foregoing polylactic acid are not limited particularly as long as the molding is enabled substantially. However, the weight-average molecular weight preferably is not less than 10,000, more preferably not less than 40,000, and particularly preferably not less than 80,000.

Further, since the aforementioned resin composition contains, as a compatibilizer, a polymeric material that is formed from an alkyl methacrylate monomer and that has a weight-average molecular weight of not less than 950,000 and not more than 4,100,000, the polylactic acid and the thermoplastic resin are mixed finely and homogeneously, and has high impact resistance and heat resistance.

To enhance the impact resistance of the foregoing resin composition to a level higher than that of the polylactic acid, it is necessary that the weight-average molecular weight of the compatibilizer should be not less than 950,000 and not more than 4,100,000.

The alkyl methacrylate monomer for forming the foregoing compatibilizer preferably is at least one selected from methyl methacrylate, ethyl methacrylate, propyl methacrylate, and butyl methacrylate. These are considered to form a pseudo-cross-linked state by forming a long chain as a result of polymerization and being entangled with molecules of the polylactic acid and the thermoplastic resin as matrix resins, thereby to enhance the impact resistance and the heat resistance of the matrix resins. The compatibilizer may be a homopolymer of the aforementioned monomer component, or a copolymer of the same.

The content by weight of the foregoing compatibilizer in the mixture preferably is not less than 5 percent by weight (wt %) and not more than 15 wt % with respect to the total weight of the resin composition. With the content being in the foregoing range, the impact resistance of the resin composition can be enhanced further.

The thermoplastic resin is not limited particularly as long as it has an impact resistance and a heat resistance higher than those of the polylactic acid, but preferably it is at least one type of resin selected from polycarbonate, ABS resin, polycarbonate-ABS resin alloy, polystyrene, high-impact polystyrene, modified polyphenylene ether, polybutylene terephthalate, polyethylene terephthalate, polyacetal, polyamide, polypropylene, polymethyl methacrylate, and polyethylene. This is because these materials have sufficiently higher impact resistance and heat resistance than those of the polylactic acid.

The mixing ratio by weight of the polylactic acid and the thermoplastic resin preferably is in a range of 4:6 to 3:7, and more preferably, in a range of 3.5:6.5 to 3:7. With the mixing ratio being in the foregoing range, both of the characteristic of the polylactic acid and the characteristic of the thermoplastic resin can be exhibited more effectively.

It is preferable that a crystal nucleator is mixed in the foregoing resin composition so that the crystallization of the polylactic acid is promoted and the stiffness and heat resistance are improved. The crystal nucleators are classified into organic nucleators and inorganic nucleators; examples of the organic nucleators include metal salts of benzoic acid and metal salts of organic phosphoric acid ester, and examples of the inorganic nucleators include talc, mica, montmorillonite, and kaolin.

Preferably further added to the foregoing resin composition is a silicone-based fire retardant, an organic metal salt-based fire retardant, an organic phosphor-based fire retardant, a metal oxide-based fire retardant, a metal hydroxide-based fire retardant, or the like. This makes it possible to improve the fire retarding property thereby preventing fire spreading, as well as to enhance the flowability of the resin composition, thereby ensuring more excellent moldability.

A lactic acid-based polyester preferably is further added as a modifying agent to the foregoing resin composition. This not only enhances the impact resistance, but also enhances the fire retarding effect. As the lactic acid-based polyester, a polymer obtained by copolymerizing a lactic acid, a dicarboxylic acid, and a diol can be used. Examples of the dicarboxylic acid include succinic acid, adipic acid, sebacic acid, decanedicarboxylic acid, cyclohexane dicarboxylic acid, phthalic acid, terephthalic acid, and isophthalic acid. Examples of diol include ethylene glycol, propylene glycol, 1,3-propane diol, 1,4-butane diol, 1,5-pentane diol, and 1,6-hexane diol.

Preferably further added as a filler to the foregoing resin composition is hemp fiber, chitin-chitosan, coconut shell fiber, kenaf, short fiber derived from the same (length: not more than 10 mm), powder derived from the same, or the like. This further enhances the stiffness and heat resistance of the molded product. Besides, since they are natural materials, they do not affect the characteristic of the molded product that the product is derived from a plant origin.

Preferably further added as a filler to the foregoing resin composition is glass fiber, carbon fiber, glass flake, glass beads, or the like. This further enhances the stiffness and Izod impact strength of the molded product.

Further, the following may be added as an additive to the foregoing resin composition: a plasticizer, a weathering resistance modifier, an antioxidant, a heat stabilizer, a light stabilizer, a UV absorbent, a lubricant, a mold-release agent, a pigment, a colorant, various types of fillers, an antistatic agent, a perfume, a foaming agent, an antibiotic-antifungal agent, etc. The addition of such an additive improves the impact resistance, the heat resistance, the stiffness, etc., while imparting other properties. In the selection of such additives, it is preferable that in light of the properties of the polylactic acid-based polymer alloy, a material placing only low load on the environment should be selected, such as a material e that is nontoxic for organisms and that does not generate toxic gas upon combustion.

Examples of the plant resin molded product of the present invention include plant resin enclosures for electronic equipment such as notebook personal computers and cellular telephones. FIG. 1 is a front view of an enclosure for a notebook personal computer as an example of the plant resin molded product of the present invention. The enclosure of FIG. 1 can be formed by injection molding.

Next, an embodiment of a method for manufacturing a plant resin composition and a plant resin molded product of the present invention. An example of a method for manufacturing a plant resin composition of the present invention includes a step of mixing the above-described compatibilizer into a mixture of a pellet of a polylactic acid and a pellet of a thermoplastic resin at a mixing ratio by weight of 4:6 to 3:7, and a step of kneading the mixture.

Regarding a mixing method, a pellet of a polylactic acid, a pellet of a thermoplastic resin, and a compatibilizer may be dry-blended, or alternatively, a part of a compatibilizer may be pre-blended in a pellet of a polylactic acid or a thermoplastic resin and thereafter the rest of the compatibilizer, a pellet of a polylactic acid, and a pellet of a thermoplastic resin may be dry-blended. As a mixing machine, a roll mill, a Banbury mixer, a super mixer, or the like may be used. The content by weight of the compatibilizer is set to be 5 wt % to 15 wt % with respect to the total weight of the resin composition.

The kneading can be carried out by using an extruder. As an extruder, any one of a single-screw extruder and a twin-screw extruder can be used, but a co-rotating twin-screw extruder preferably is used, because it makes it possible to mix a resin pellet and a compatibilizer more homogeneously. The melting temperature is set to be in a range of 210° C. to 230° C.

Further, the compatibilizer may be supplied to a single-screw extruder or a twin-screw extruder by using a side feeder or the like.

A method for manufacturing a plant resin molded product of the present invention includes a step of molding the above-described resin composition by injection molding, extrusion molding, blow molding, vacuum molding, compression molding, etc. The molding conditions may be set as follows, for example, in the case of injection molding: as the conditions for drying a resin composition before injection molding, the drying temperature is 70° C. to 100° C., and the drying time is four hours to six hours; and upon injection molding the mold temperature is 10° C. to 85° C., the cylinder temperature is 210° C. to 230° C., and the cooling time is 10 seconds to 90 seconds.

The following will more specifically describe the present invention while referring to Examples.

EXAMPLE 1

<Preparation of Resin Composition>

A pellet of polylactic acid (PLA) produced by Mitsui Chemicals, Inc., "LECEA H-100J" (trade name), was dried at 80° C. for five hours. A pellet of polycarbonate-ABS resin alloy (PC/ABS) produced by Daicel Polymer Ltd., "Novalloy S1100" (trade name), was dried at 100° C. for four hours. Further, a powder of methyl methacrylate (MMA)-based compatibilizer produced by Mitsubishi Rayon Co., Ltd., "METABLEN P-551A" (trade name, weight-average molecular weight: 1,450,000) was prepared.

27 parts by weight of the above-described PLA pellet, 63 parts by weight of the above-described PC/ABS pellet, and 10 parts by weight of the MMA-based compatibilizer powder were mixed, and kneaded by using a co-rotating and intermeshing, two-vent-type twin-screw extruder produced by TECHNOVEL CORP., "KZW-30MG" (trade name), at a melting temperature of 230° C. After the kneading, the molten material was extruded through vents of the extruder in a strand form, cooled with water, and thereafter cut by a pelletizer. Thus, a resin composition (polylactic acid-based polymer alloy) in a pellet form of the present example was prepared.

The mixing ratio by weight of the PLA pellet and the PC/ABS pellet was PLA pellet: PC/ABS pellet=27:63=3:7. The content by weight of the MMA-based compatibilizer powder in the mixture was 10 wt % with respect to the total weight of the resin composition.

<Measurement of Izod Impact Strength>

After the above-described pellet-form resin composition was dried at 90° C. for five hours, it was subjected to injection molding at a mold temperature of 80° C., a cylinder temperature of 220° C., and a cooling time of 30 seconds, whereby a test piece No. 1 according to JIS (Japanese Industrial Standards) Z 2204 (12 mm×127 mm×3.2 mm) was formed. By processing the test piece No. 1 thus formed, a test piece No. 2-A according to JIS Z 2204 (12 mm×64 mm×3.2 mm, notch: 2.54 mm) was formed, and its Izod impact strength was measured. More specifically, the test piece No. 2-A was subjected to the Izod impact strength test according to JIS K 7110 by using an Izod impact tester produced by Toyo Seiki Seisaku-sho, Ltd., "B-121202403" (trade name). The results obtained are shown in Table 1.

<Measurement of Flexural Strength>

After the above-described pellet-form resin composition was dried at 90° C. for five hours, it was subjected to injection molding at a mold temperature of 80° C., a cylinder temperature of 220° C., and a cooling time of 30 seconds, whereby a test piece No. 1 according to JIS Z 2204 (12 mm×127 mm×3.2 mm) was formed, and its flexural strength was measured. More specifically, a flexural strength test was performed according to JIS K 7203 by using a universal tester produced by Instron Corp., "INSTRON 5581" (trade name). The results obtained are shown in Table 1, as "flexural elastic modulus".

<Measurement of Load Deflection Temperature>

After the above-described pellet-form resin composition was dried at 90° C. for five hours, it was subjected to injection molding at a mold temperature of 80° C., a cylinder temperature of 220° C., and a cooling time of 30 seconds, whereby a test piece No. 1 according to JIS Z 2204 (12 mm×127 mm×3.2 mm) was formed, and its load deflection temperature was measured. More specifically, a load deflection temperature test was performed by using a heat distortion tester produced by Yasuda-Seiki-Seisakusho, LTD., "148HD-PC" (trade name), with the conditions other than the test piece size being set according to JIS K 7220. The results obtained are shown in Table 1.

COMPARATIVE EXAMPLE 1

A resin composition was prepared in the same manner as that in Example 1 except that the MMA-based compatibilizer powder was not used, and the Izod impact strength, the flexural strength, and the load deflection temperature were measured in the same manner as that in Example 1. The results obtained are shown in Table 1.

COMPARATIVE EXAMPLE 2

A resin composition formed with the PLA pellet alone used in Example 1 was prepared, and the Izod impact strength, the flexural strength, and the load deflection temperature were measured in the manner as that in Example 1. The results obtained are shown in Table 1.

TABLE 1

| | Content of Compatibilizer (wt %) | Izod Impact Strength (kgf·cm/cm) | Flexural Elastic Modulus (kgf/cm$^2$) | Load Deflection Temperature (° C.) |
|---|---|---|---|---|
| Example 1 | 10 | 13.3 | 28848 | 78.7 |
| Comp. Ex. 1 | — | 1.7 | 28805 | 80.0 |
| Comp. Ex. 2 | — | 3.1 | 36847 | 50.0 |

It is clear from Table 1 that the Izod impact strength of Example 1 in which the compatibilizer was used was enhanced to more than 7.8 times as compared with Comparative Example 1 in which a compatibilizer was not used, and to more than 4.2 times as compared with Comparative Example 2 in which only the polylactic acid was used. The flexural elastic modulus of Example 1 was slightly inferior to that of Comparative Example 2, but it is still sufficient as a strength of, for example, an enclosure for electronic equipment. Further, the load deflection temperature of Example 1 was higher than that of Comparative Example 2. As described above, it can be seen that the polylactic acid-based polymer alloy of Example 1 had enhanced impact resistance and heat resistance as compared with the composition of a polylactic acid alone of Comparative Example 2.

<Optimization of Molecular Weight of Compatibilizer>

Resin compositions were prepared in the same manner as that of Example 1 except that the weight-average molecular weight of the MMA-based compatibilizer powder was varied, and the respective compositions were subjected to the measurement of the Izod impact strength, the flexural strength and the load deflection temperature in the same manner as that of Example 1. Besides, a resin composition to which an acrylic resin was added, as a reference example having a weight-average molecular weight of not less than 10,000,000, was also subjected to the same measurement. The results obtained are shown in Table 2. It should be noted that in Table 2, the example having a weight-average molecular weight of 1,450,000 was equivalent to Example 1, and the example whose weight-average molecular weight is not shown was equivalent to Comparative Example 1.

TABLE 2

| Weight-Average Molecular Weight | Izod Impact Strength (kgf·cm/cm) | Flexural Elastic Modulus (kgf/cm$^2$) | Load Deflection Temperature (°C.) |
|---|---|---|---|
| 10,000,000 or more | 1.9 | 29985 | 78.1 |
| 4,100,000 | 11.1 | 28483 | 81.0 |
| 3,600,000 | 11.2 | 29079 | 79.1 |
| 1,450,000 | 13.3 | 28848 | 78.7 |
| 950,000 | 6.4 | 28750 | 76.7 |
| 280,000 | 4.6 | 27220 | 76.6 |
| — | 1.7 | 28805 | 80.0 |

Since the polylactic acid alone had an Izod impact strength of about 3 kgf·cm/cm, in order for a resin composition to have an impact resistance twice or more that of the polylactic acid, it is clear from Table 2 that the weight-average molecular weight of the compatibilizer to be added to the resin composition has to be in a range of not less than 950,000 and not more than 4,100,000. It should be noted that no significant differences were observed regarding the flexural elastic modulus and the load deflection temperature.

<Optimization of Content by Weight of Compatibilizer>

Resin compositions were prepared in the same manner as that of Example 1 except that the content by weight of the MMA-based compatibilizer power was varied, and the respective compositions were subjected to the measurement of the Izod impact strength, the flexural strength and the load deflection temperature in the same manner as that of Example 1. The results obtained are shown in Table 3. It should be noted that in Table 3, the example in which the content by weight thereof was 10 wt % was equivalent to Example 1, while the example in which the content by weight thereof was 0 wt % was equivalent to Comparative Example 1.

TABLE 3

| Content by Weight (wt %) | Izod Impact Strength (kgf·cm/cm) | Flexural Elastic Modulus (kgf/cm$^2$) | Load Deflection Temperature (°C.) |
|---|---|---|---|
| 0 | 1.7 | 28805 | 80.0 |
| 2 | 3.5 | 28775 | 79.0 |
| 5 | 9.0 | 29312 | 80.4 |
| 10 | 13.3 | 28848 | 78.7 |
| 15 | 11.8 | 29148 | 75.1 |

It is clear from Table 3 that the content by weight of the compatibilizer preferably is not less than 5 wt % and not more than 15 wt % with respect to the total weight of the resin composition. It should be noted that no significant differences were observed regarding the flexural elastic modulus and the load deflection temperature.

<Optimization of Mixing Ratio by Weight of Polylactic Acid and Thermoplastic Resin>

Resin compositions were prepared in the same manner as that of Example 1 except that the mixing ratio by weight of the PLA pellet and the PC/ABC pellet was varied and that a methyl methacrylate (MMA)-based compatibilizer produced by Mitsubishi Rayon Co., Ltd. that had a weight-average molecular weight set to 4,100,000, i.e., "METABLEN P-531A" (trade name) was used, and the respective compositions were subjected to the measurement of the Izod impact strength, the flexural strength and the load deflection temperature in the same manner as that of Example 1. The results obtained are shown in Table 4. It should be noted that in Table 4, the resin composition in which PC/ABC was used alone was equivalent to Comparative Example 1, and the resin composition in which PLA was used alone was equivalent to Comparative Example 2.

TABLE 4

| PLA:PC/ABC | Izod Impact Strength (kgf·cm/cm) | Flexural Elastic Modulus (kgf/cm$^2$) | Load Deflection Temperature (°C.) |
|---|---|---|---|
| PLA alone | 3.1 | 36847 | 50.0 |
| 4:6 | 4.4 | 30168 | 63.6 |
| 3.5:6.5 | 6.0 | 29467 | 70.8 |
| 3:7 | 11.8 | 29151 | 81.4 |
| PC/ABC alone | 1.7 | 28805 | 80.0 |

It is clear from Table 4 that the mixing ratio by weight of the polylactic acid and the thermoplastic resin preferably is 4:6 to 3:7, and more preferably 3.5:6.5 to 3:7.

INDUSTRIAL APPLICABILITY

As described above, the present invention can provide a plant resin composition having high impact resistance and heat resistance, as well as a plant resin molded product formed with the foregoing resin composition. Therefore, the present invention makes it possible to enhance impact resistances and heat resistances of enclosures formed with plant resin compositions, which are to be used for electronic equipment typified by notebook personal computers, cellular telephones, etc.

The invention claimed is:

1. A plant resin composition comprising:
   a polylactic acid;
   a thermoplastic resin;
   a compatibilizer;
   a polymer obtained by copolymerizing a lactic acid, a dicarboxylic acid, and a diol; and
   at least one fire retardant selected from the group consisting of a silicone-based fire retardant, an organic metal salt-based fire retardant, and a metal hydroxide-based fire retardant,
   wherein the compatibilizer is a polymeric material formed from an alkyl methacrylate monomer and having a weight-average molecular weight of not less than 950,000 and not more than 4,100,000, and
   the thermoplastic resin is at least one type of resin selected from the group consisting of polycarbonate, ABS resin, polycarbonate-ABS resin alloy, polystyrene, high-impact polystyrene, modified polyphenylene ether, polybutylene terephthalate, polyethylene terephthalate, polyamide, polypropylene, polymethyl methacrylate, and polyethylene.

2. The plant resin composition according to claim 1, wherein
the alkyl methacrylate monomer is at least one selected from the group consisting of methyl methacrylate, ethyl methacrylate, propyl methacrylate, and butyl methacrylate.

3. The plant resin composition according to claim 1, wherein
a content by weight of the compatibilizer is not less than 5 wt % and not more than 15 wt % with respect to a total weight of the resin composition.

4. The plant resin composition according to claim 1, wherein
a mixing ratio by weight of the polylactic acid and the thermoplastic resin is 4:6 to 3:7.

5. A plant resin molded product formed with a plant resin composition comprising:
a polylactic acid;
a thermoplastic resin;
a compatibilizer;
a polymer obtained by copolymerizing a lactic acid, a dicarboxylic acid, and a diol; and
at least one fire retardant selected from the group consisting of a silicone-based fire retardant, an organic metal salt-based fire retardant, and a metal hydroxide-based fire retardant,
wherein the compatibilizer is a polymeric material formed from an alkyl methacrylate monomer and having a weight-average molecular weight of not less than 950,000 and not more than 4,100,000, and
the thermoplastic resin is at least one type of resin selected from the group consisting of polycarbonate, ABS resin, polycarbonate-ABS resin alloy, polystyrene, high-impact polystyrene, modified polyphenylene ether, polybutylene terephthalate, polyethylene terephthalate, polyamide, polypropylene, polymethyl methacrylate, and polyethylene.

6. The plant resin molded product according to claim 5, wherein
the alkyl methacrylate monomer is at least one selected from the group consisting of methyl methacrylate, ethyl methacrylate, propyl methacrylate, and butyl methacrylate.

7. The plant resin molded product according to claim 5, wherein
a content by weight of the compatibilizer is not less than 5 wt % and not more than 15 wt % with respect to a total weight of the resin composition.

8. The plant resin molded product according to claim 5, wherein
a mixing ratio by weight of the polylactic acid and the thermoplastic resin is 4:6 to 3:7.

* * * * *